(12) United States Patent
Herbig et al.

(10) Patent No.: US 10,380,280 B2
(45) Date of Patent: Aug. 13, 2019

(54) OPTIMAL STORAGE OF LOAD DATA FOR LIFETIME PREDICTION FOR EQUIPMENT USED IN A WELL OPERATION

(71) Applicants: Christian Herbig, Celle Lower Saxony (DE); Andreas Hohl, Hannover Lower Saxony (DE); Armin Kueck, Bremen (DE); Michael Neubert, Braunschweig (DE); Hanno Reckmann, Nienhagen (DE)

(72) Inventors: Christian Herbig, Celle Lower Saxony (DE); Andreas Hohl, Hannover Lower Saxony (DE); Armin Kueck, Bremen (DE); Michael Neubert, Braunschweig (DE); Hanno Reckmann, Nienhagen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 118 days.

(21) Appl. No.: 15/354,279

(22) Filed: Nov. 17, 2016

(65) Prior Publication Data
US 2018/0137220 A1    May 17, 2018

(51) Int. Cl.
*G06F 17/50*     (2006.01)
*G06F 17/18*     (2006.01)
*E21B 44/00*     (2006.01)

(52) U.S. Cl.
CPC .......... *G06F 17/5009* (2013.01); *E21B 44/00* (2013.01); *G06F 17/18* (2013.01); *G06F 2217/16* (2013.01)

(58) Field of Classification Search
CPC .......... G06F 15/00; G06F 17/18; G06F 17/50; G06F 17/5009; G06F 19/00;

(Continued)

(56) References Cited

U.S. PATENT DOCUMENTS

| | | |
|---|---|---|
| 2008/0065705 A1 | 3/2008 | Miller |
| 2011/0022554 A1* | 1/2011 | Reckmann .............. E21B 41/00 706/17 |

(Continued)

FOREIGN PATENT DOCUMENTS

| | | | |
|---|---|---|---|
| WO | WO-2015005923 A1 * | 1/2015 | ............. E21B 12/02 |
| WO | 2015094766 A1 | 6/2015 | |
| WO | 2015132717 A1 | 9/2015 | |

OTHER PUBLICATIONS

Amit A. Kale, Katrina Carter-Journet, Troy A. Falgout, Ludger Heuermann-Kuehn, Derick Zurcher (2014), Annual Conference of the Prognositcs and Health Management Society, pp. 1-13 (Year: 2014).*

(Continued)

*Primary Examiner* — Kamini S Shah
*Assistant Examiner* — Stephen D. Ford
(74) *Attorney, Agent, or Firm* — Cantor Colburn LLP

(57) ABSTRACT

Examples of techniques for optimal storage of load data for lifetime prediction for a piece of equipment used in a well operation are disclosed. In one example implementation according to aspects of the present disclosure, a method may include: using a lifetime model for the piece of equipment used in the well operation; discretizing, by a processing device, a load data spectrum into one or more buckets, the one or more buckets having a bucket size, wherein the bucket size of at least one bucket is based on one of the lifetime model and a distribution of load data; collecting load data of the piece of equipment; assigning, by the processing device, the collected load data to the one or more buckets of the load data spectrum; and storing, by the processing device, the collected load data assigned to the one or more buckets to a memory.

18 Claims, 12 Drawing Sheets

(58) Field of Classification Search
CPC .... G06F 2217/16; G01V 99/00; G01V 11/00; G01M 13/00; E21B 44/00; E21B 49/00; E21B 49/003
See application file for complete search history.

(56) References Cited

U.S. PATENT DOCUMENTS

| | | |
|---|---|---|
| 2014/0047107 A1 | 2/2014 | Maturana et al. |
| 2014/0279795 A1* | 9/2014 | Shibuya ............ G05B 23/0254 706/46 |
| 2015/0106015 A1* | 4/2015 | Dashevskiy .......... G01M 13/00 702/6 |
| 2015/0167454 A1* | 6/2015 | Kale .................... E21B 49/003 702/9 |
| 2015/0185363 A1* | 7/2015 | Herbig ................. E21B 49/003 702/6 |
| 2015/0220080 A1 | 8/2015 | Nixon et al. |

OTHER PUBLICATIONS

Hanno Reckmann, Pushkar Jogi, Franck Kpetehoto, Sridharan Chandrasekaran, John Macpherson (2010), IADC/SPE Drilling Conference in New Orleans, Louisiana, Feb. 2-4, 2010 (Year: 2010).*

Notification of Transmittal of the International Search Report and the Written Opinion of the International Searching Authority, or the Declaration; PCT/US2017/061485; dated Feb. 13, 2018; 11 pages.

* cited by examiner

OPTIMAL STORAGE OF LOAD DATA FOR LIFETIME PREDICTION FOR EQUIPMENT USED IN A WELL OPERATION

BACKGROUND

The present disclosure relates to well operations and, more particularly, to determining optimal storage of load data for lifetime prediction for pieces of equipment (i.e. electronic components) used in a well operation.

Boreholes are drilled into earth formations having reservoirs of hydrocarbons in order to extract the hydrocarbons through the boreholes to the surface. Various components (e.g., pipe segments, pipe couplings, pipe valves, manifolds, stabilizers, reamers, jars, downhole motors, steering units, formation evaluation sensors, drill bits etc.) connect to a bottom hole assembly which is operated in a borehole from a drill rig at the earth's surface.

Downhole equipment in the boreholes may utilize electronic components for control, monitoring, and communication or other components such as mechanical components, electro-mechanical components, hydraulics, formation evaluation sensors (LWD), measurement while drilling sensors (MWD). Over time, operating conditions (e.g., high temperature, high pressure, excessive acceleration, electrical voltage or current spikes, mechanical stress etc.) downhole may cause damage to or otherwise degrade components, thereby shortening the useful life of a component and/or leading to catastrophic failure of a component.

BRIEF SUMMARY

According to aspects of the present disclosure, techniques including methods, systems, and/or computer program products for optimal discretization of load data for lifetime prediction for a piece of equipment used in a well operation are provided. An example method may include: using a lifetime model for the piece of equipment used in the well operation; discretizing, by a processing device, a load data spectrum into one or more buckets, the one or more buckets having a bucket size, wherein the bucket size of at least one bucket is based on one of the lifetime model and a distribution of load data; collecting load data of the piece of equipment; assigning, by the processing device, the collected load data to the one or more buckets of the load data spectrum; and storing, by the processing device, the collected load data assigned to the one or more buckets to a memory.

According to additional aspects of the present disclosure, an example system may include: a sensor collecting load data of the piece of equipment; and a processing device for executing computer readable instructions, the computer readable instructions comprising: determining a lifetime model for the piece of equipment used in the well operation; discretizing a load data spectrum into one or more buckets, the one or more buckets having a bucket size, wherein the bucket size of at least one bucket is based on either the lifetime model or a distribution of load data; assigning the collected load data to the one or more buckets of the load data spectrum; and storing the collected load data assigned to the one or more buckets to a memory.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
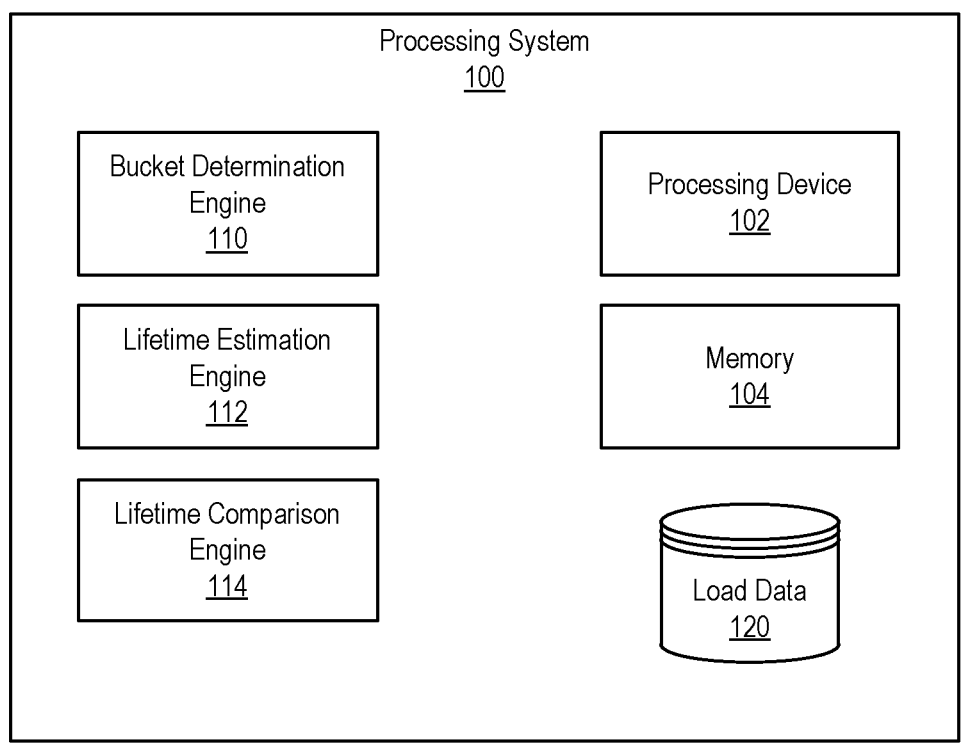
FIG. 1 illustrates a processing system for estimating the lifetime of a piece of equipment used in a well operation according to aspects of the present disclosure.

Estimating lifetime of a piece of equipment (e.g., communication tools, steering units, and other equipment) used in a well operation reduces failures at the job site and enables servicing and/or replacement of the piece equipment at appropriate times. To accurately predict lifetime of the piece of equipment, load data is measured and stored on one or more pieces of equipment for loads on the piece of equipment. Examples of loads may be temperature, accelerations, RPM, torque, bending, pressure, electrical loads, axial and lateral forces and other aspects that influence the lifetime of a piece of equipment.

The storage of load data can be used for lifetime prediction of the piece of equipment. Lifetime models can be estimated by relating load data to equipment failures. The lifetime model provides information on how likely a piece of equipment fails by applying a particular load. An initial lifetime model, also referred to as existing lifetime model, may be determined by using historical load data. This historical load data refers to accumulated loads at the event of a failure. The lifetime model gives a probability that a failure happens at a specific load including a certain variance which may be caused by slight differences in the piece of equipment, manufacturing variations, material variations and other statistical parameters. If the load data is collected in buckets of the load data spectrum, the load data are averaged in this bucket or set to the mean value of the bucket. Alternatively, the median or root square mean or other representative averaging algorithms may be used. A bucket in the load data spectrum is represented by a representative value calculated by applying the representative averaging algorithm on the load data within a bucket. Next, a count of how often a load data is collected in each the buckets occurs. Load data may be either the historical load data or the new load data. The counts are saved to a memory. Therefore, an optimal storage of the load data to a memory with limited size, is provided herein.

Different failure mechanisms exist for different types of equipment (e.g., electronics, mechanical parts, hydraulics, connections, formation evaluation sensors (LWD), measurement while drilling sensors (MWD), etc.). Lifetime of the piece of equipment is dependent on the load cycles and amplitude of the loads. The lifetime is dependent on the failure mechanism of the part. Whereas electronics are mainly prone to failures related to temperature and electrical loads (current and voltage), mechanical integrity is mainly dependent on mechanical loads (e.g. pressure, acceleration, momentums like bending, axial and lateral forces etc.). The present techniques provide for estimating the lifetime of a piece of equipment used in the well operation to optimize maintenance cycles or supply of spare parts.

Severe accelerations in drill strings and bottom hole assemblies (BHA) can be caused by different excitation mechanisms like self-excitation, parameter excitation, or forced excitation. Accelerations can be differentiated into axial, torsional, and lateral directions. Negative effects include reduced rate of penetration, reduced quality of measurements, and downhole failures. Further loads may include temperature and erosion, pressure, torque, bending.

One approach, as provided herein is to measure lifetime relevant data at the piece of equipment used in the well operation and store the data in a memory at the piece of equipment. The lifetime relevant data measurement and/or processing and storage may be performed by using dedicated electronics modules at or in the piece of equipment and/or different pieces of equipment along a BHA. Application specific integrated circuits (ASICs) are utilized for this purpose with limited memory. ASICs are placed, for example, on multi-chip models (MCMs) in a piece of equipment to store load data for the piece of equipment. The load data is then used to perform lifetime estimation for the piece of equipment. This may be, in this example, referred to as lifetime estimated electronics. Load data of other types of equipment, such as Formation Evaluation sensors (e.g. gamma, acoustic, NMR, nuclear) or mechanical, electro-mechanical or hydraulic pieces of equipment, such as motors, pumps, valves or bearings, may be measured and/or processed and stored in the memory in the electronics module. Based on the collected lifetime relevant data and the estimated lifetime, a condition based maintenance (CBM) may be performed.

A method is disclosed to discretize a lifetime dependent load data spectrum, (e.g., temperature and acceleration and the like) in buckets. As used herein, the term bucket refers to a load data interval. Each bucket is associated to an interval or region of load data. The distribution of load data in the bucket could be represented by a number of load data points within a load data interval or a time spent in a load data interval. The load data interval can be defined by one or multiple variables, such as temperature, acceleration or pressure. The method includes determining optimal bucket sizes in the load data spectrum dependent on one of a lifetime model and a load data distribution and other mathematical functions to minimize the failure of the lifetime estimation with limited memory. The method can also be used to estimate the necessary memory for a given tolerance of the lifetime estimation, also referred to as failure of the lifetime estimation. For a given maximum failure of the life time estimation the required bucket sizes of the plurality of buckets in the load data spectrum are calculated. The memory size required to store the distribution of a measured load data based on the plurality of buckets in the load data spectrum can be calculated.

The present techniques utilize memory for storing load data in a more optimized, efficient, and cost effective manner than existing solutions. For example, existing solutions store load data (e.g., time-based data) without discretizing the load data spectrum into buckets, which uses more memory size in the memory, thereby increasing memory size and costs associated therewith. The present techniques, however, use less memory than existing solutions by determining optimum bucket sizes of the load data spectrum and assigning the load data to the buckets, transforming the load data into a load data distribution or load data profile. This discretization of the load data spectrum and transformation of load data improves the functioning of processing devices by more efficiently utilizing memory. The present techniques also use time-based-load-data and transform the time-based load data into buckets and distribution of load data or load data profiles. Moreover, the present techniques provide buckets of different sizes such that smaller buckets are used near an expected value while larger buckets are used for values in unexpected intervals. This reduces the amount of memory used while also providing more accurate discretizing near expected values. These and other advantages will be apparent from the description that follows.

The teachings of the present disclosure can be applied in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

By non-limiting example a well operation may also be a drilling operation in a wellbore. Different pieces of equipment (downhole tools) are combined to become a bottom hole assembly (BHA). The bottom hole assembly being operatively connected to a drill string at the upper end (surface end) and having a drill bit at the lower end (downhole end). The bottom hole assembly containing different type of equipment, such as a mud motor, steering unit, formation evaluation sensors and MWD tools, such as directional, mud pulse communication tools, power generation tools (turbine or battery). The formation evaluation sensors, also referred to as LWD tools, may be resistivity, nuclear magnetic resonance, acoustic, downhole sampling, nuclear or pressure testing tools. There may be a bi-directional communication between the bottom hole assembly and surface via mud pulse telemetry including a downlink, electromagnetic telemetry, acoustic telemetry, wired pipe or any other suitable communication link. Depending on the different pieces of equipment which are in a particular bottom hole assembly, the different purpose of the bottom hole assembly, the different material of the bottom hole assembly or the diameter of a bottom hole, the bottom hole assembly is referred to a bottom hole assembly type.

In examples, a memory may be in and/or on a piece of equipment in the bottom hole assembly. The discretizing may be performed based on load data retrieved from the bottom hole assembly after a drilling run at surface or may be done downhole based on downhole measured load data. A real time lifetime estimation may be performed in a processor inside the piece of equipment either downhole or at surface or in a separate processor located outside the piece of equipment either downhole or at surface. In the first case the lifetime estimation is transmitted to surface. Rerun decisions may be made based on the lifetime estimation. In case the lifetime estimation of the piece is close to, or already exceeded the lifetime of a piece of equipment, the piece of equipment may be replaced by another piece of equipment.

FIG. 1 illustrates a processing system 100 for estimating the lifetime of a piece of equipment used in a well operation according to aspects of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), embedded controllers, hardwired circuitry, etc.), or as some combination or combinations of these.

In examples, the engine(s) described herein may be a combination of hardware and programming. The programming may be processor executable instructions stored on a tangible memory, and the hardware may include a processing device 102 for executing those instructions. Thus a memory 104 can store program instructions that when executed by processing device 102 implement the engines described herein. Other engines may also be utilized to include other features and functionality described in other examples herein.

Processing system 100 may include the processing device 102, the system memory 104, a bucket determination engine 110, a lifetime estimation engine 112, a lifetime comparison engine 114, and a load data repository 120. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The bucket determination engine 110 discretizes the load data spectrum into a plurality of buckets. The bucket size of each of the plurality of buckets is based on the distribution of the load data and/or based on an existing lifetime model for the piece of equipment as described below. The distribution of load data may be based on historical load data on the piece of equipment. The historical load data, the distribution of load data, and other information such as the measured lifetimes of components achieved in field operations, may be stored in the load data repository 120, for example.

At block 112, a lifetime estimation is performed from the data stored in the buckets.

Additionally or alternatively to discretizing the load data spectrum the memory may be compartmentalized into compartments based on one of the lifetime model and the distribution of load data. The size of the compartments in the memory is based on one of the lifetime model or the distribution of load data. The distribution of load data is stored to the compartmentalized memory.

Instead of counting how often a load data is collected in each of the load data interval any other quantity that may represent the weight of a load data interval of the measured load data may be saved to the memory.

Figure 2:
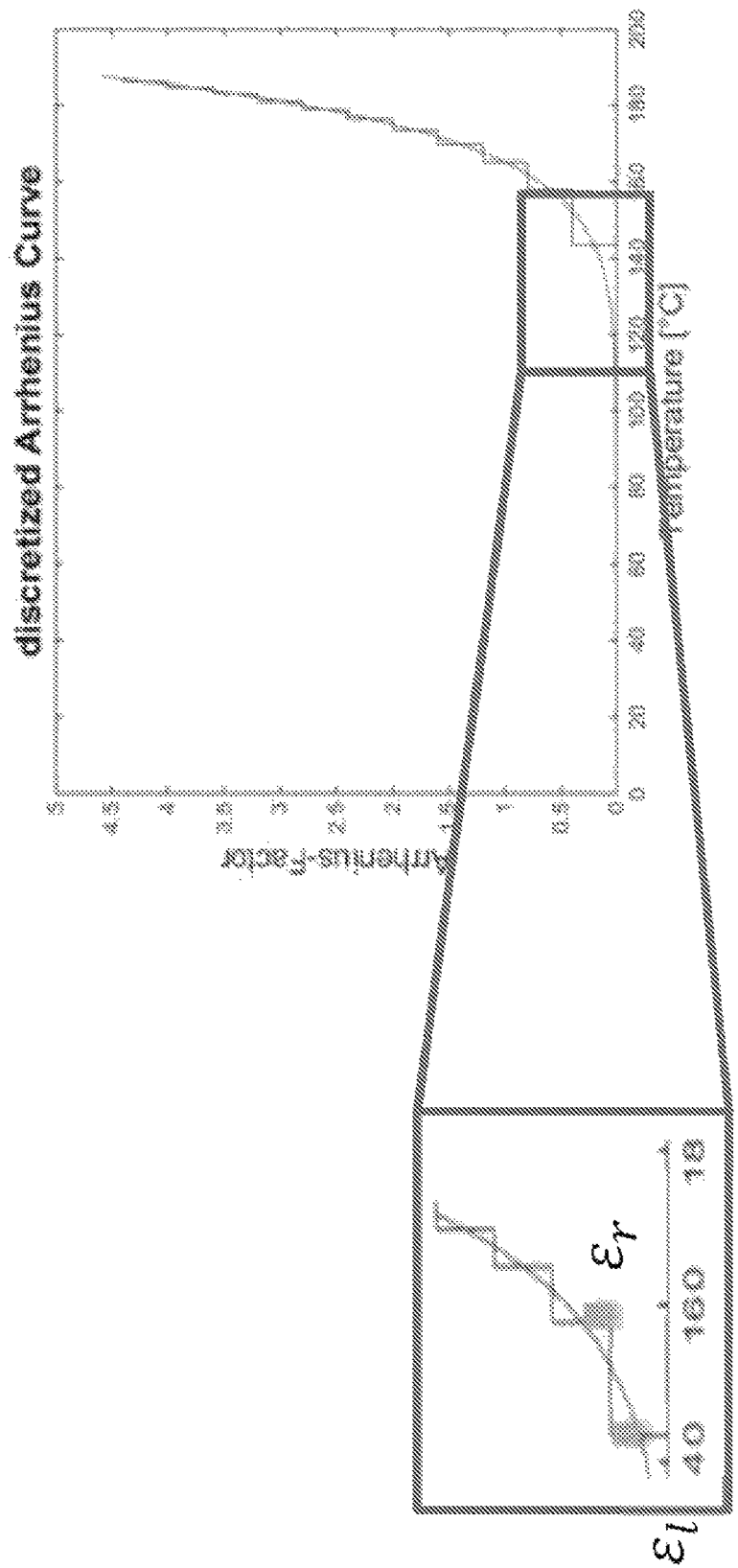
FIG. 2 illustrates a graph of a discretized Arrhenius Curve according to aspects of the present disclosure.

According to aspects of the present disclosure, the lifetime of electronics for equipment used in well operations can be described by the Arrhenius curve, as illustrated in FIG. 2. By updating the bucket sizes of the load data spectrum, the overall failure based on the lifetime model is minimized. The load data spectrum in FIG. 2 is the temperature interval to which the electronics are exposed. Updating refers to recalculating the bucket sizes for the plurality of buckets of the data spectrum. In particular, the bucket size may be updated such that the failure $\varepsilon_l$ on the "left" side of a bucket is the same size as the failure $\varepsilon_r$ on the "right" side of a bucket. This failure is then constant for each bucket and is therefore limited to this value.

In addition, an expected temperature or a frequency of the temperature may influence the size of a bucket. For example, it is not useful to collect temperature data in buckets at a temperature level that will not be reached during the expected run. An example of a typical distribution of the accelerations is illustrated in FIG. 3.

Figure 3:
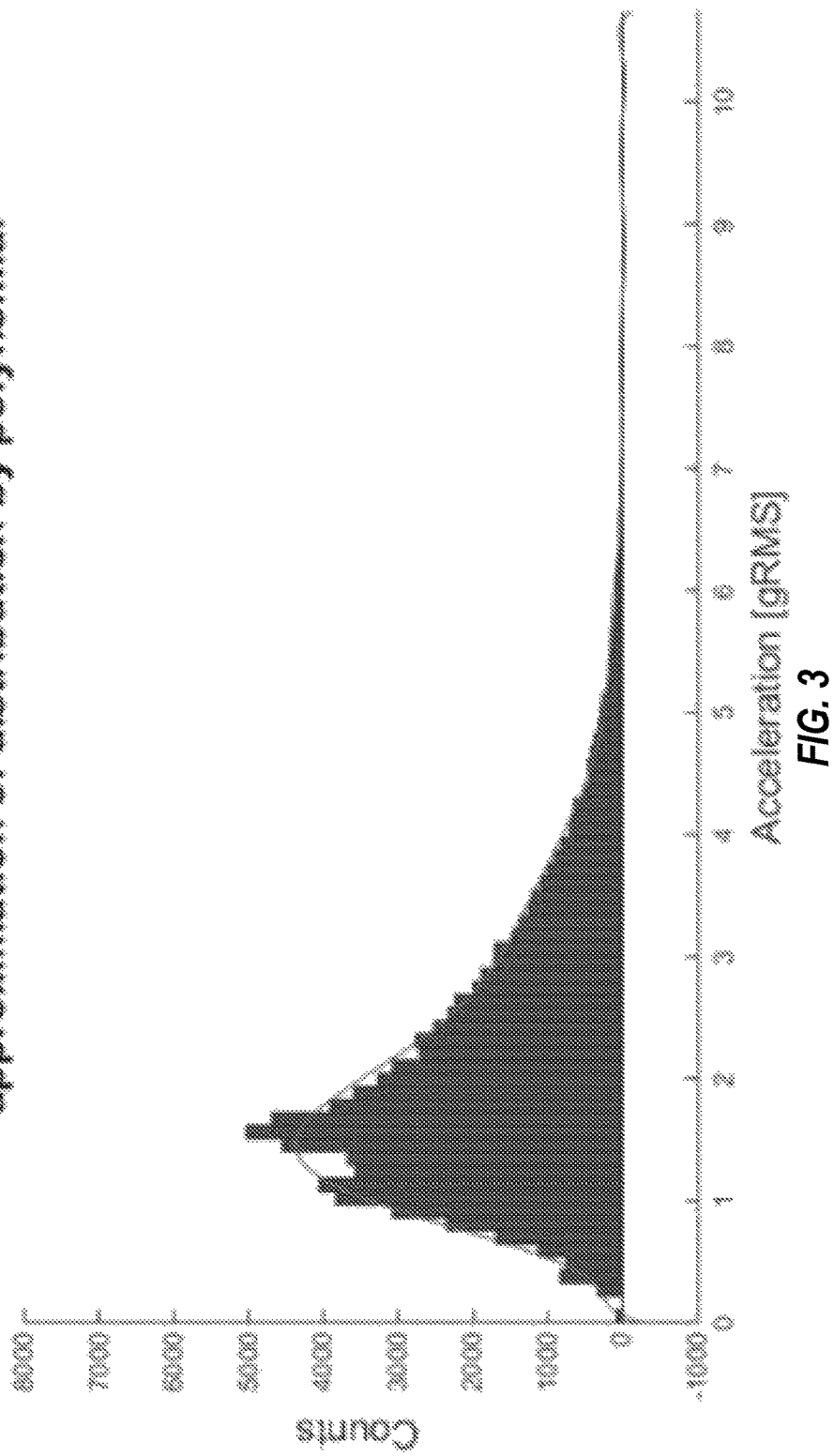
FIG. 3 illustrates a graph of typical distribution of load data, e.g. accelerations according to examples of the present disclosure.

In accordance with the acceleration example of FIG. 3, the bucket determination engine 110 (FIG. 1) updates the bucket size during operation to achieve gRMS values of the acceleration so that each bucket is approximately equal using the following equation.

$$\int_{x_{i-1}}^{x_i} p(x)dx = \text{constant}$$

where $x_i$ is the lower (left) bucket limit, $x_{i-1}$ is the upper (right) bucket limit, and $p(x)$ is a probability density function. The probability density function $p(x)$ can be derived from a histogram or a distribution of load data or a frequency distribution of load data according to aspects of the present disclosure. The variable x and the lower limit $x_i$ and upper limit $x_{i-1}$ can also be a vector of multiple variables such as temperature and accelerations. The function $p(x)$ is a probability density function that may be dependent on multiple variables. According to FIG. 4, the area (i.e., probability) below each bucket is equal. Therefore, the bucket size is larger at points of low probabilities and higher at points of high probabilities of the expected acceleration. Every probability density function may be possible. By non-limiting example, the probability density function may be a Weibull distribution, a Gauss distribution, a normal distribution, or an exponential distribution. It may also be possible to fit a polynomial to the distribution of loads. More than one type of load data may be used to determine a probability density function, by non-limiting example this may be temperature and acceleration or temperature and acceleration and pressure or any other combination of load data, resulting in one, two or multidimensional probability density functions.

By combining the lifetime model and the distribution of load data of expected loads, such as historical load data or synthetic load data, optimal bucket sizes may be determined. By way of exemplification, but not limiting, the probability density function is multiplied with the lifetime model L(x)

for every value of the load x. Other mathematical operations may as well be suited to combine the distribution of load with the lifetime model. In examples, x may be temperature or gRMS level of accelerations. The function $F(x_i)=p(x_i)L(x_i)$ reflects the lifetime that is consumed at the load x according to the distribution of the load x that gives the number of samples (in the bucket) and the lifetime model L. The lifetime consumed in one bucket is constant for each bucket of the function F if the distribution of the load data is equal to $p(x)$ and the lifetime model is equal to $L(x)$.

The optimal bucket sizes may be adjacent, or may have gaps between each other, or may be overlapping. By non-limiting example, it may be of use to store load data from opposite sides of the load data spectrum in only one bucket. The buckets do not need to cover the whole load data spectrum. A particular bucket may have a cross section with another bucket. Yet another bucket may be a subset of another bucket.

Figure 5:
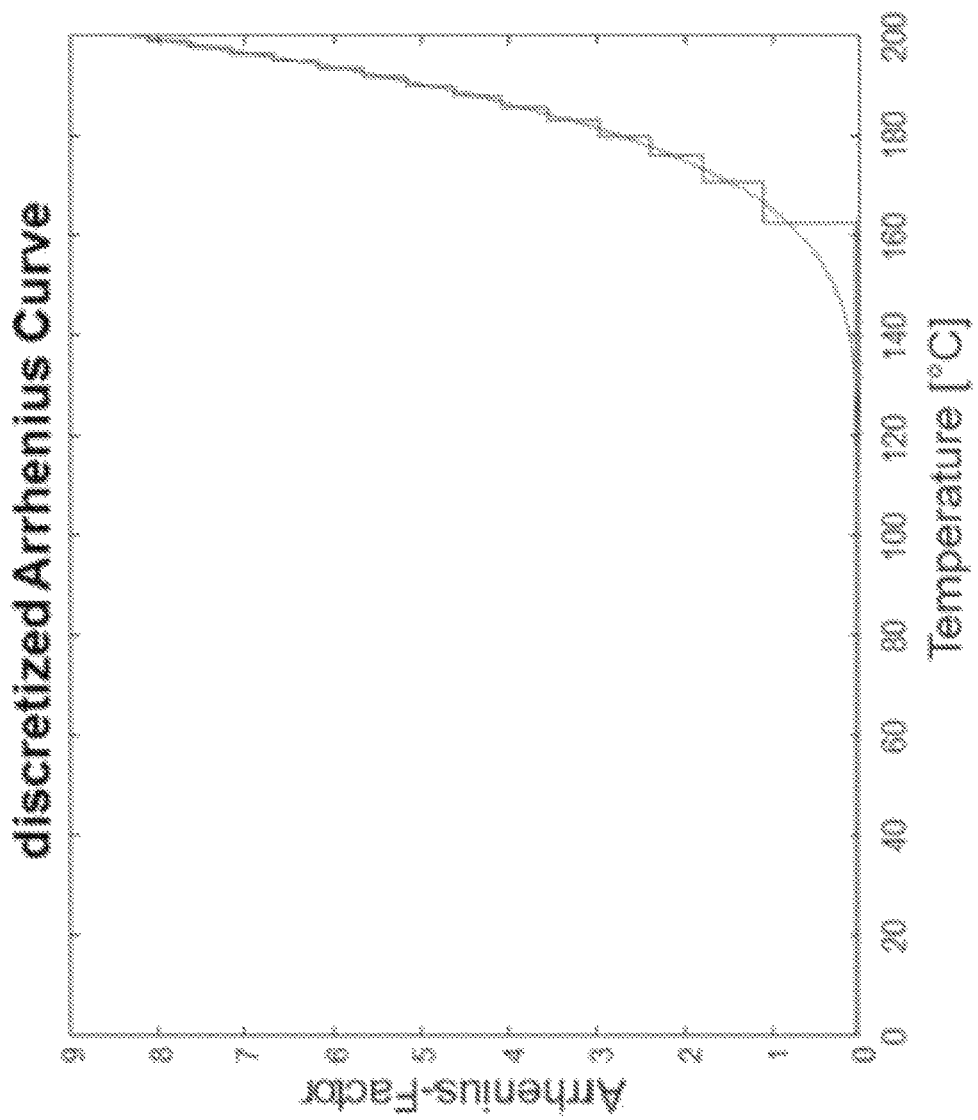
FIG. 5 illustrates a graph of a discretized Arrhenius Curve technique according to examples of the present disclosure.
Figure 6:
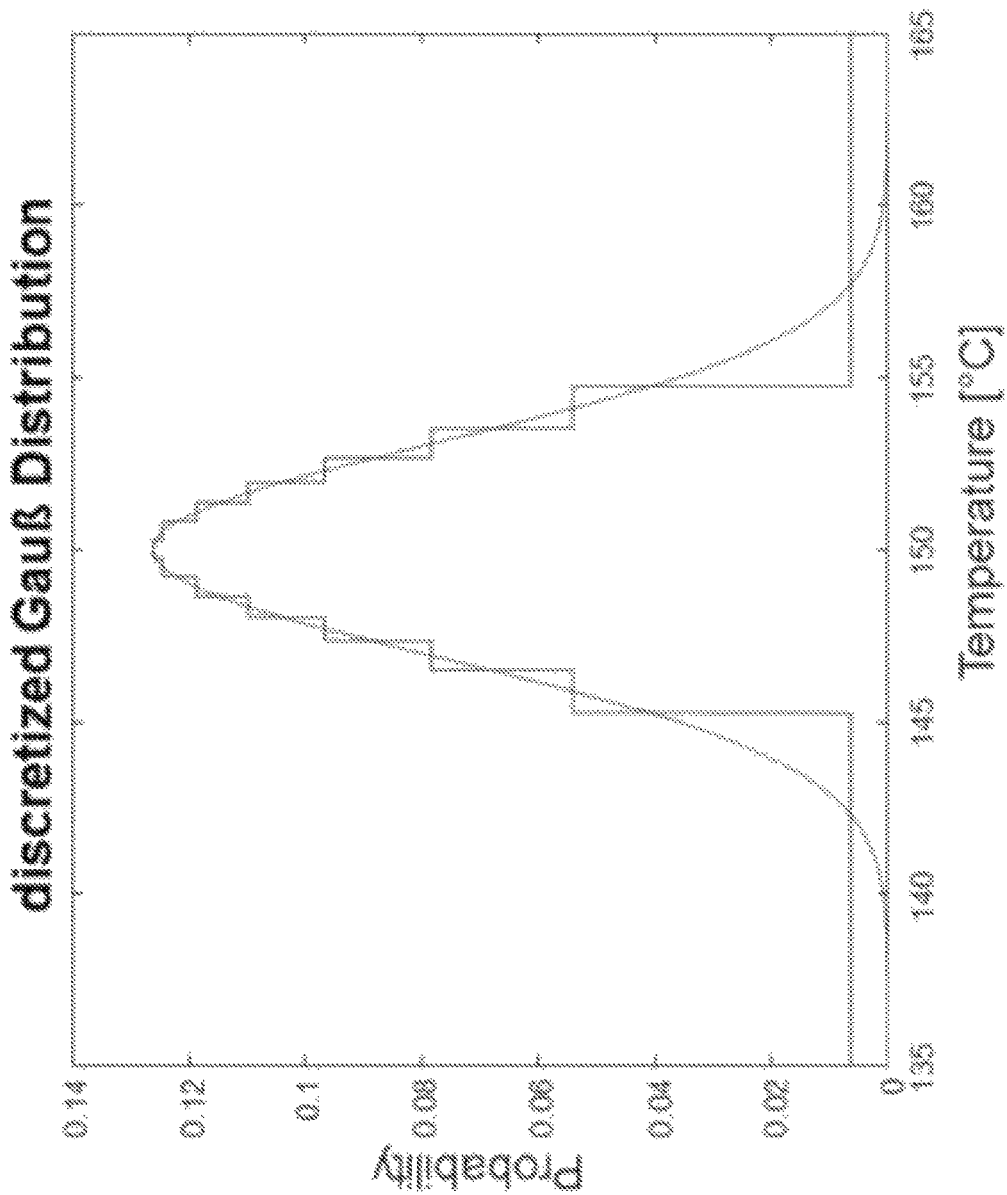
FIG. 6 illustrates a graph of a discretized Gauss-Distribution according to examples of the present disclosure.
Figure 7:
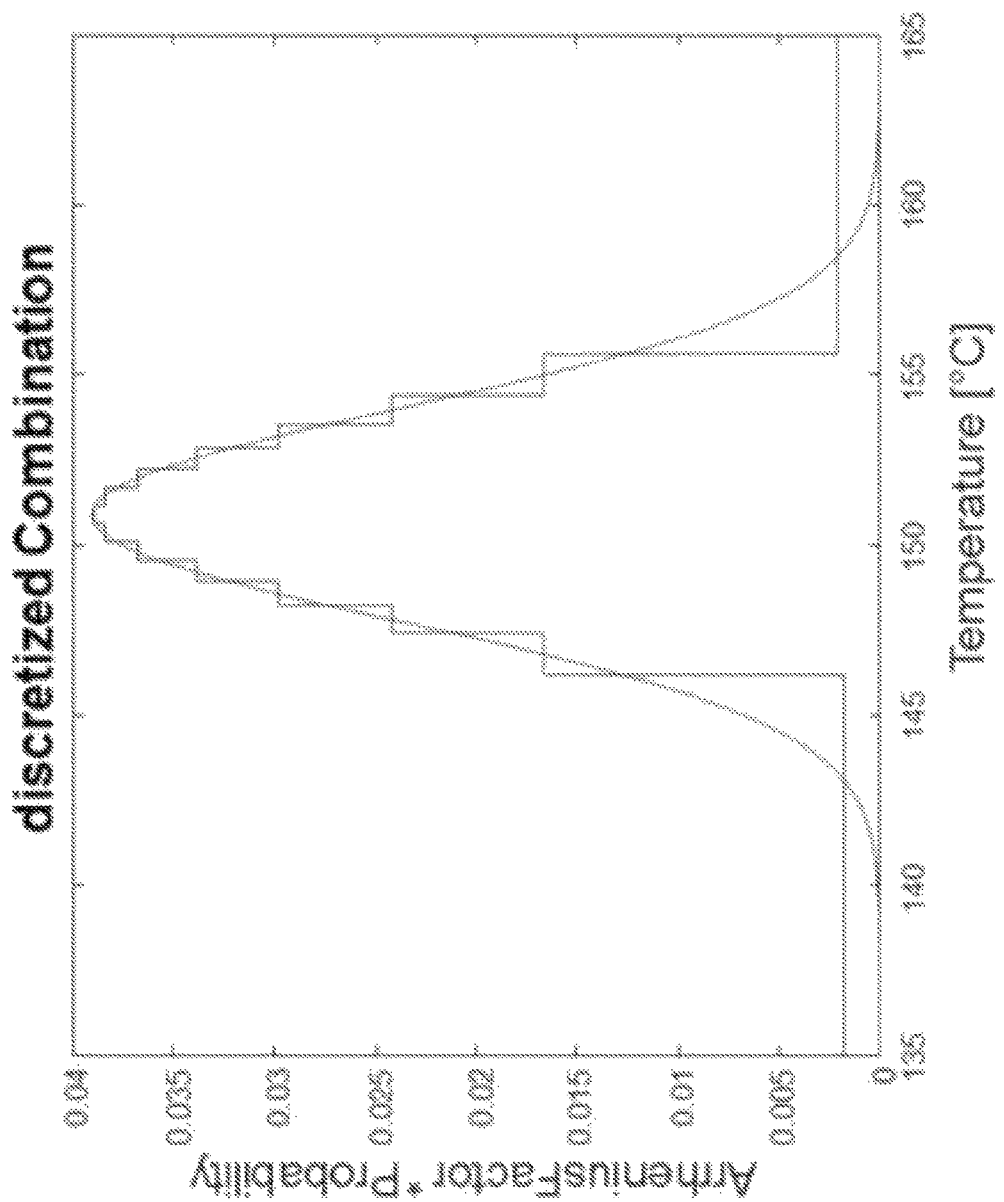
FIG. 7 illustrates a graph of a discretized combination technique of the discretized Arrhenius Curve technique of FIG. 5 and the discretized Gauss-Distribution technique of FIG. 6 according to aspects of the present disclosure.

The lifetime estimation engine 112 determines a lifetime estimation of the piece of equipment based on the new load data collected, such as during the drilling process, stored to the memory after load data is assigned to the discretized load data spectrum. FIGS. 5, 6, and 7 illustrate the lifetime estimation, as described below.

FIG. 5 illustrates an example of bucket size according to a lifetime model according to aspects of the present disclosure. FIG. 6 illustrates an example of bucket size according to frequency distribution of temperature according to aspects of the present disclosure. FIG. 7 illustrates an example of the combination (e.g., multiplication or any other suitable mathematical operation) of the lifetime model of FIG. 5 and the frequency distribution of the temperature of FIG. 6 according to aspects of the present disclosure.

According to the examples of FIGS. 5-7, a normal distribution is expected for the distribution of the temperature, and the Arrhenius factor is used as the expected lifetime model. An expected value of 150° C. and a variance of $10(°C.)^2$ is used for the expected distribution for the temperature downhole.

Regarding FIG. 5 using the discretized Arrhenius Curve technique, the maximum failure in every bucket is equal for a scalar value. In the case for continuously increasing slopes, the maximum failure is calculated by the difference of the value on the right or left side of every bucket that is given by the continuous Arrhenius Curve and the value that would be calculated by the bucket at the middle of bucket. For a maximum value of the continuous model and for a minimum value of the continuous model, the failure is indicated by the difference to the value in the middle of the bucket or another value taken as reference for this bucket. The maximum failure in each bucket is not necessarily at the border of the bucket if the lifetime model has maxima and minima in the bucket itself.

Regarding FIG. 6 using the discretized Gauss-Distribution technique, the probability to hit each bucket is equal in this case. It should be appreciated that the Gauss-Distribution technique is just one possible example and other distribution techniques may be implemented instead of or in addition to the Gauss-Distribution technique.

Regarding FIG. 7 using the discretized combined technique from FIGS. 5 and 6, the lifetime consumed in each bucket according to the lifetime model and the number of samples expected in one bucket given by the probability density function is equal. If the load values are equally distributed, this approach leads to the same result as bucket optimization by the lifetime model only.

According to aspects of the present disclosure, it may be beneficial to choose a lifetime for the buckets on the left and right border (low temperatures and high temperatures respectively) and not in the middle of the bucket. In some examples, a certain ratio may be used instead of borders. The ratio may be determined by frequency distribution of load data and/or by the lifetime model. According to the frequency distribution of the temperature, it is meaningful to limit the considered temperatures to a specified percentile (e.g. 95% or 99%) of the probability density function. Otherwise, the failures become very large because the mean value of the buckets (taken for lifetime prediction) on the border have a very low probability according to the frequency distribution of this load data. Therefore, values at the border of this bucket are classified to the middle of the bucket that results in a significant failure.

Figure 8:
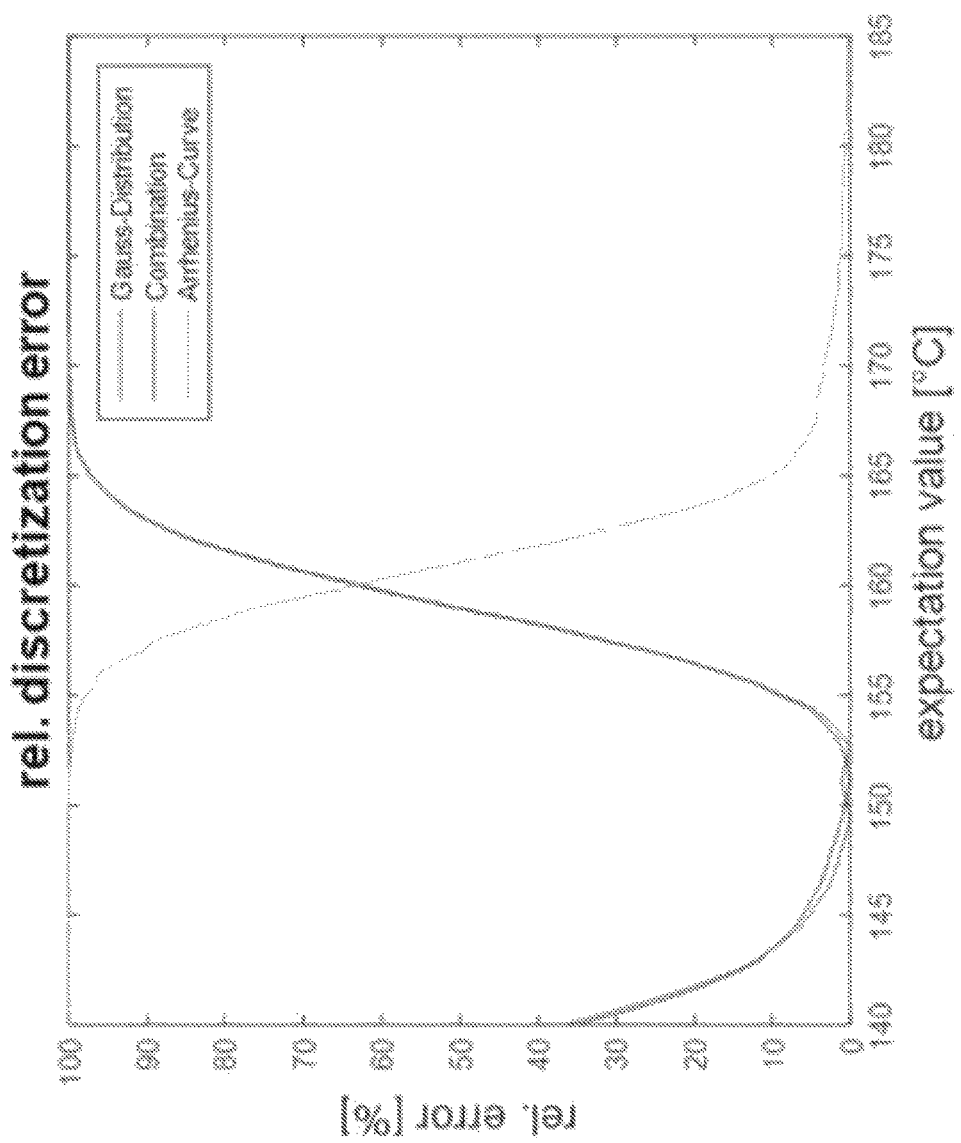
FIG. 8 illustrates a graph of a relative discretization error with respect to the continuous lifetime model according to examples of the present disclosure.

The lifetime comparison engine 114 compares the lifetime estimation of the piece of equipment with an expected lifetime of the piece of equipment. FIG. 8 illustrates one such example comparison for 15 buckets. In particular, FIG. 8 illustrates the relative discretization error with respect to the continuous lifetime model according to examples of the present disclosure. The present techniques may also apply to a nonlinear dependency of a lifetime model using two variables. For example, failures due to acceleration double if the temperature is increased by 10° C. In another example, the lifetime model is proportional to temperature multiplied by acceleration. In this case, the lifetime consumed due to temperature and lifetime due to acceleration are not simply summed up and bucket sizes may vary.

The buckets in FIG. 8 have been calculated for an expected value of 150° C. and a variance of the normal distributed temperature values of $10(°C.)^2$. In Monte-Carlo-Simulations (MCS) a variance of $10(°C.)^2$ and different expected values of the mean value of the temperature were used (e.g., 10,000 MCS for each expected value, and normal distributed calculated random numbers). The failure becomes very small at the expected value at 150° C. for the Gauss-Distribution technique (FIG. 6) and the combination technique (FIG. 7). The failure becomes large for different expected values of the normal distributed random numbers using these techniques.

The failures of the buckets that are calculated by the lifetime model only decreases for high temperatures because buckets are closely spaced in this temperature interval for the Arrhenius-Curve technique. For low expected values this results in a very large failure (<155° C.). This shows that the distribution of the temperatures has to be considered. In another example, the buckets of the Arrhenius Curve technique may be limited between specific values, e.g. percentiles, of frequency distribution of the load data.

Figure 9:
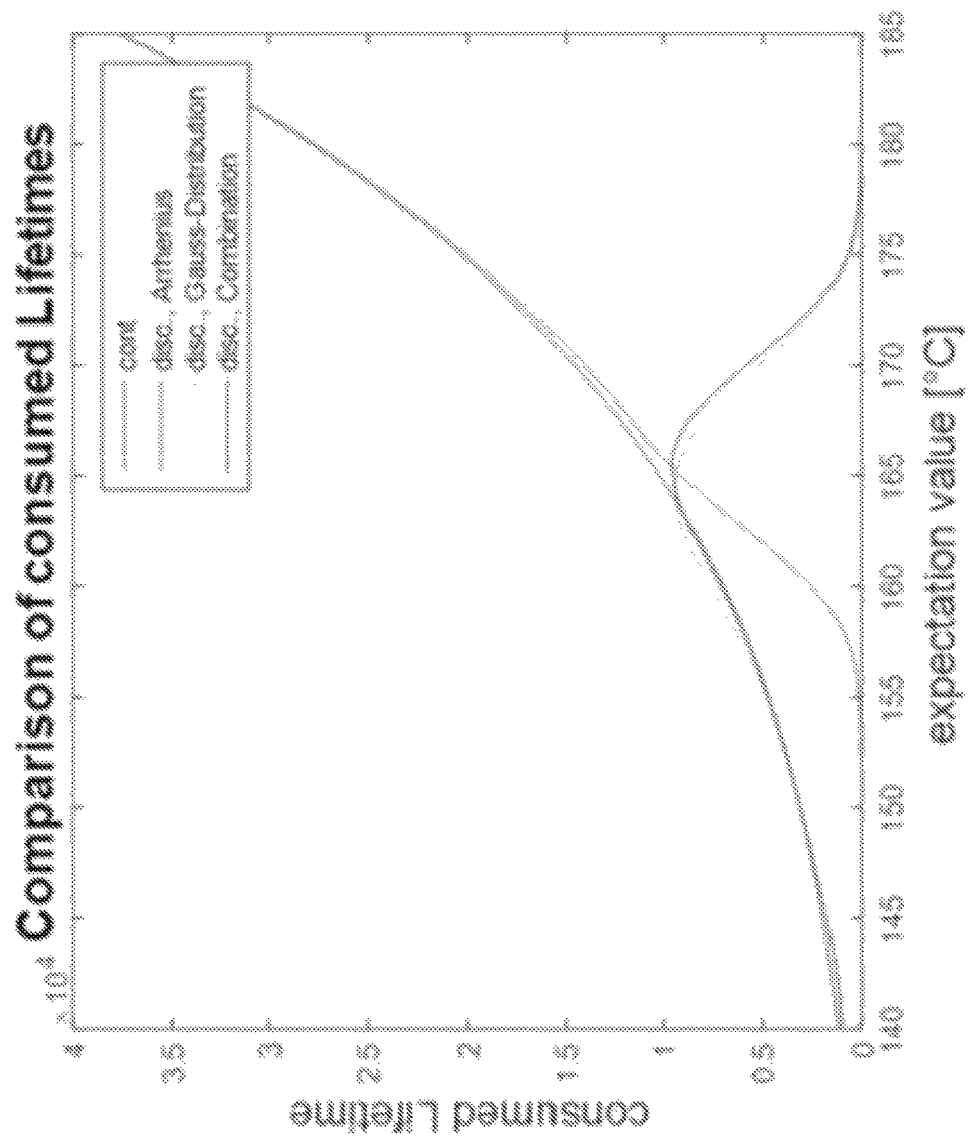
FIG. 9 illustrates a graph of a comparison of consumed lifetimes according to examples of the present disclosure.

In particular, FIG. 8 and FIG. 9 illustrate a parameter study of the expectation value of an assumed temperature distribution that might appear in a drilling operation. The expectation value is varied between 140° C. and 185° C. FIG. 8 illustrates how the relative discretization error develops. Regarding FIG. 8, the Gauss-Distribution line depicts the development of the relative discretization error when using a bucket discretization based on a Gauss-distribution of temperatures. The Arrhenius-Curve line is the development of the relative discretization error when using a discretization based on an Arrhenius-Curve as a life time function. The Combination line shows the development of the relative discretization error when using a discretization based on the combination of an Arrhenius life time function and an assumed Gauss-distribution of the temperature.

FIG. 9 illustrates how the absolute value of the predicted consumed life time varies. The studies are done for three different bucket discretization strategies. Discretization according to: a lifetime function; a distribution function; and a combination of a lifetime function and a distribution function. The cont line depicts the development of the consumed life time if continuous (analytical) functions for the lifetime function and the seen temperature distribution were used. The disc. Arrhenius line depicts the development of the consumed lifetime if a discretization based on an Arrhenius lifetime function would be used. The disc. Gaus-Distribution line shows the development of the consumed lifetime if a discretization based on a Gauss-distribution of the temperature would be used. The disc. Combination line illustrates the development of the consumed lifetime if a discretization based on a combination of an Arrhenius lifetime function and a Gauss-distribution would be used.

Figure 10:
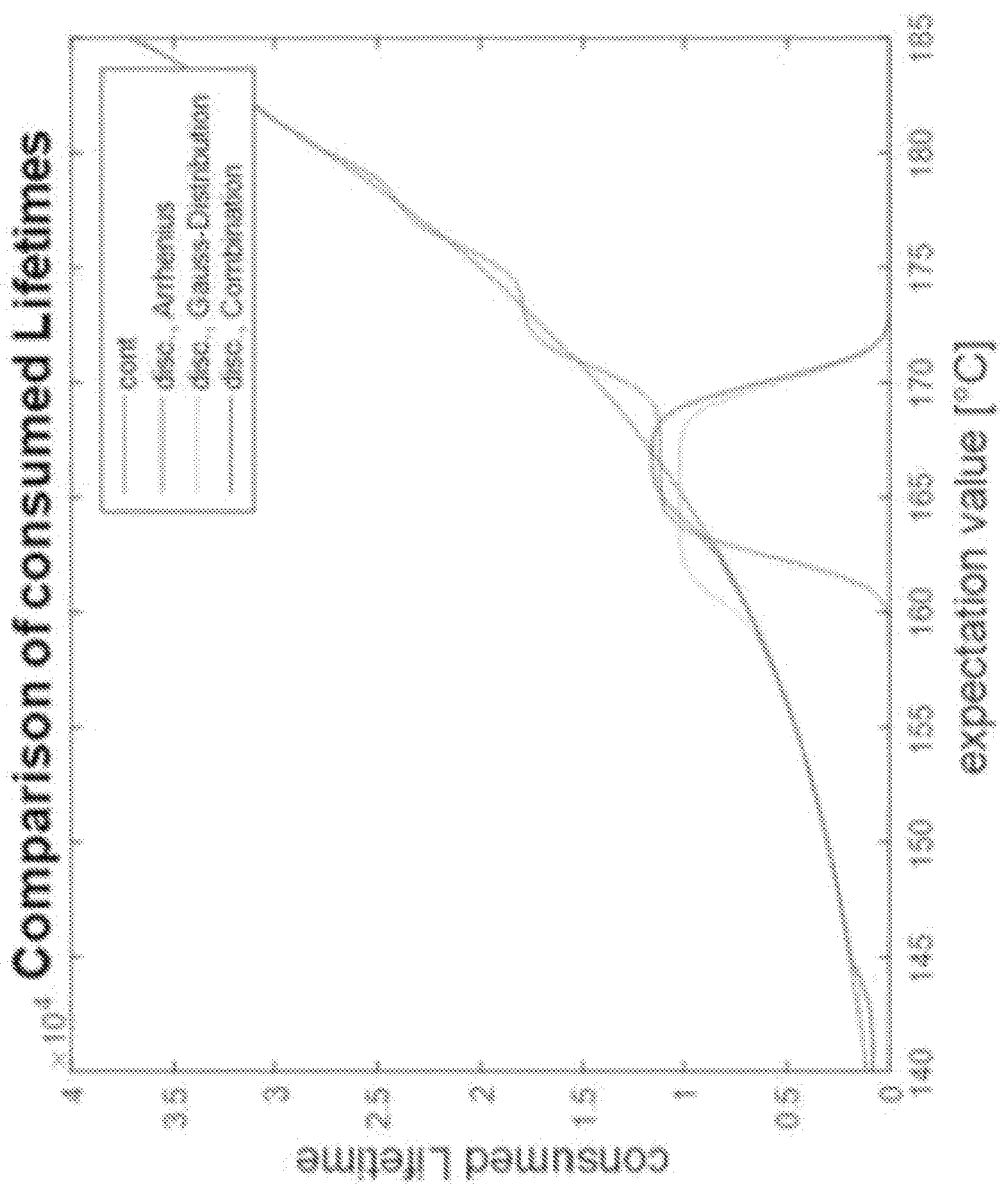
FIG. 10 illustrates a graph of a comparison of consumed lifetimes according to examples of the present disclosure.

Another example using 15 buckets is illustrated in FIGS. 9 and 10. In particular, FIG. 9 illustrates the comparison of consumed lifetimes according to examples of the present disclosure. The calculated consumed lifetime is depicted for the three techniques of FIGS. 5-7 above against the exact (continuous) value.

The buckets in FIG. 9 have been calculated for an expected value of 150° C. and a variance of the normal distributed temperature values of 50(° C.)$^2$. In Monte-Carlo-Simulations (MCS) a variance of 10(° C.)$^2$ and different expectation values along the x-axis of the mean value of the temperature were used (e.g., 10,000 MCS for each expected value, and normal distributed calculated random numbers). The continuous ("cont") line represents the exact value of the consumed lifetime according to the lifetime model. It is illustrated that the failure is very low for the buckets calculated using the Gauss-Distribution technique (FIG. 6) and the discretized combination technique (FIG. 7). between 140° C. and 165° C.

This is expected because in both techniques the calculated buckets are discretized according to the frequency distribution of the temperature. It should be appreciated that a higher variance used to calculate the optimal bucket size than used in the MCS makes the present techniques robust for changes of the expected value. The failure of the lifetime prediction becomes very large above 165° C., because only one bucket exists in this area. The failures of the buckets that are calculated by the lifetime model only decreases for high temperatures because buckets are closely spaced in this temperature interval for the discretized Arrhenius Curve technique (FIG. 5).

The buckets in FIG. 10 have been calculated for an expected value of 150° C. and a variance of the normal distributed temperature values of 50(° C.)$^2$. In Monte-Carlo-Simulations (MCS) a variance of 1(° C.)$^2$ and different expected values of the mean value of the temperature were used (e.g., 10,000 MCS for each expected value, and normal distributed calculated random numbers). That means that the distribution of the temperature is very narrow and the values are nearly equal. The same results are achieved for the general trends of the three methods as in FIG. 9. Nevertheless, the buckets can be identified by the steps in the lifetime prediction for the Arrhenius Curve technique. Accordingly, the predicted lifetime is equal to the theoretical value shown by the continuous value line for a mean value of the expected value in the middle of one bucket and becomes large at the border of the buckets.

As described herein, it should be appreciated that the failure of lifetime prediction can be very high if the bucket location and size is not updated properly. In some cases, a lifetime model is not existent. Therefore, a higher number of buckets is useful to account for uncertainties. Otherwise, an estimation of the lifetime model is not possible. The present techniques may also be used to estimate loads or lifetimes for neighboring parts. In examples, the load data could be used and combined with physical models of a drilling system to achieve better lifetime estimations. A combination of more than one load type (e.g., temperature and acceleration) could be included based on the same assumptions.

Figure 11:
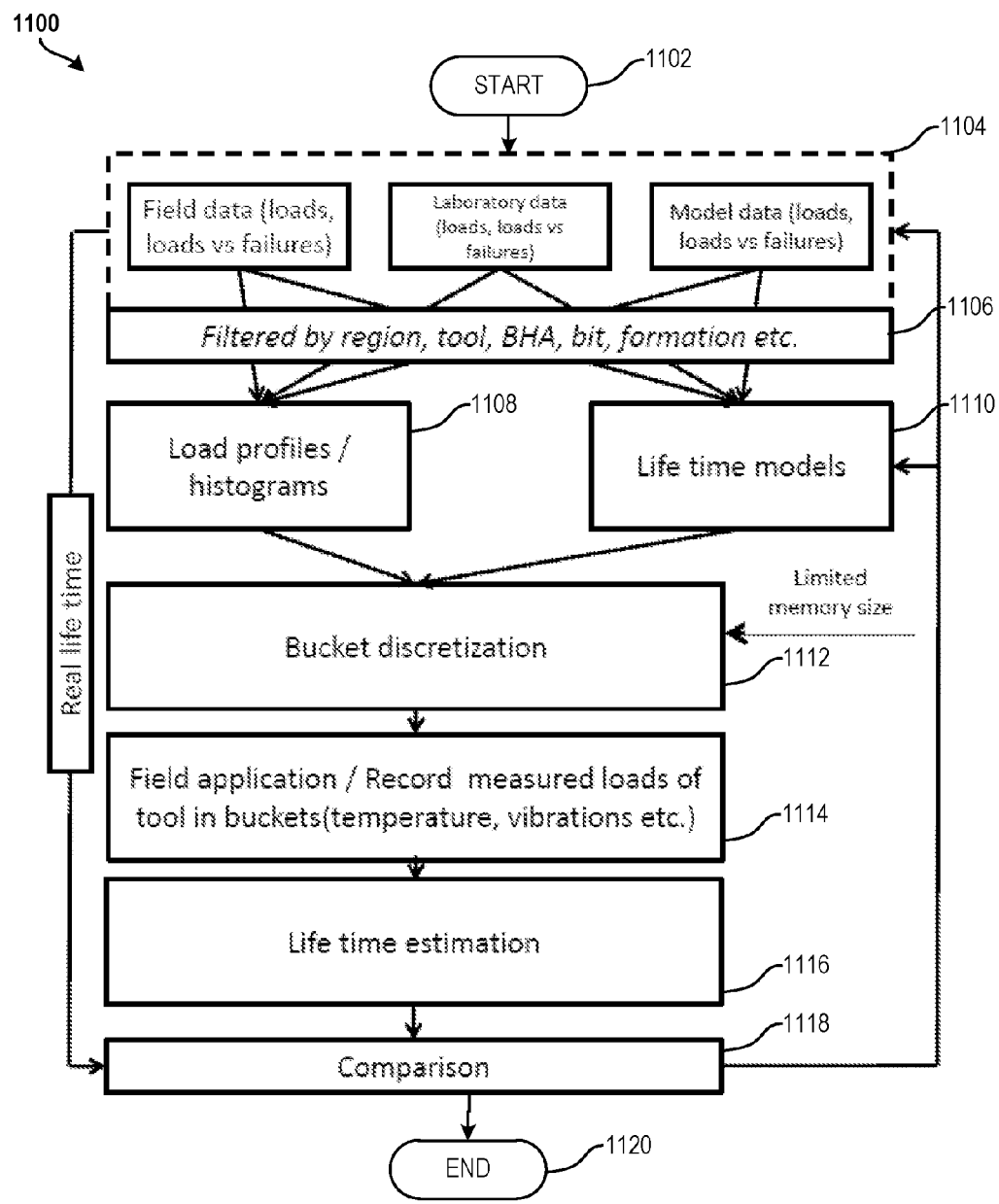
FIG. 11 illustrates a flow diagram of a method for identifying and determining wear of a component used in a well operation according to aspects of the present disclosure.

FIG. 11 illustrates a flow diagram of a method 1100 for determining wear of a component used in well operation according to examples of the present disclosure. The method 1100 may be performed by a processing system, such as the processing system 100 of FIG. 1, the processing system 20 of FIG. 12, and/or by another suitable processing system. The method 1100 starts at block 1102 and continues to block 1104.

At block 1104, the method 1100 includes storing historical load data (e.g., loads, loads vs. failures, etc.). The historical load data may be collected from field data, laboratory data, synthetic data and/or model data.

At block 1106, the method 1100 includes filtering the load data. The load data may be filtered, such as by a geographic region where the data were acquired, an equipment type, a bottom hole assembly type (bottom hole assembly build and included equipment types), a drilling bit type, and/or a formation type. Other suitable filtering may also be applied.

Figure 4:
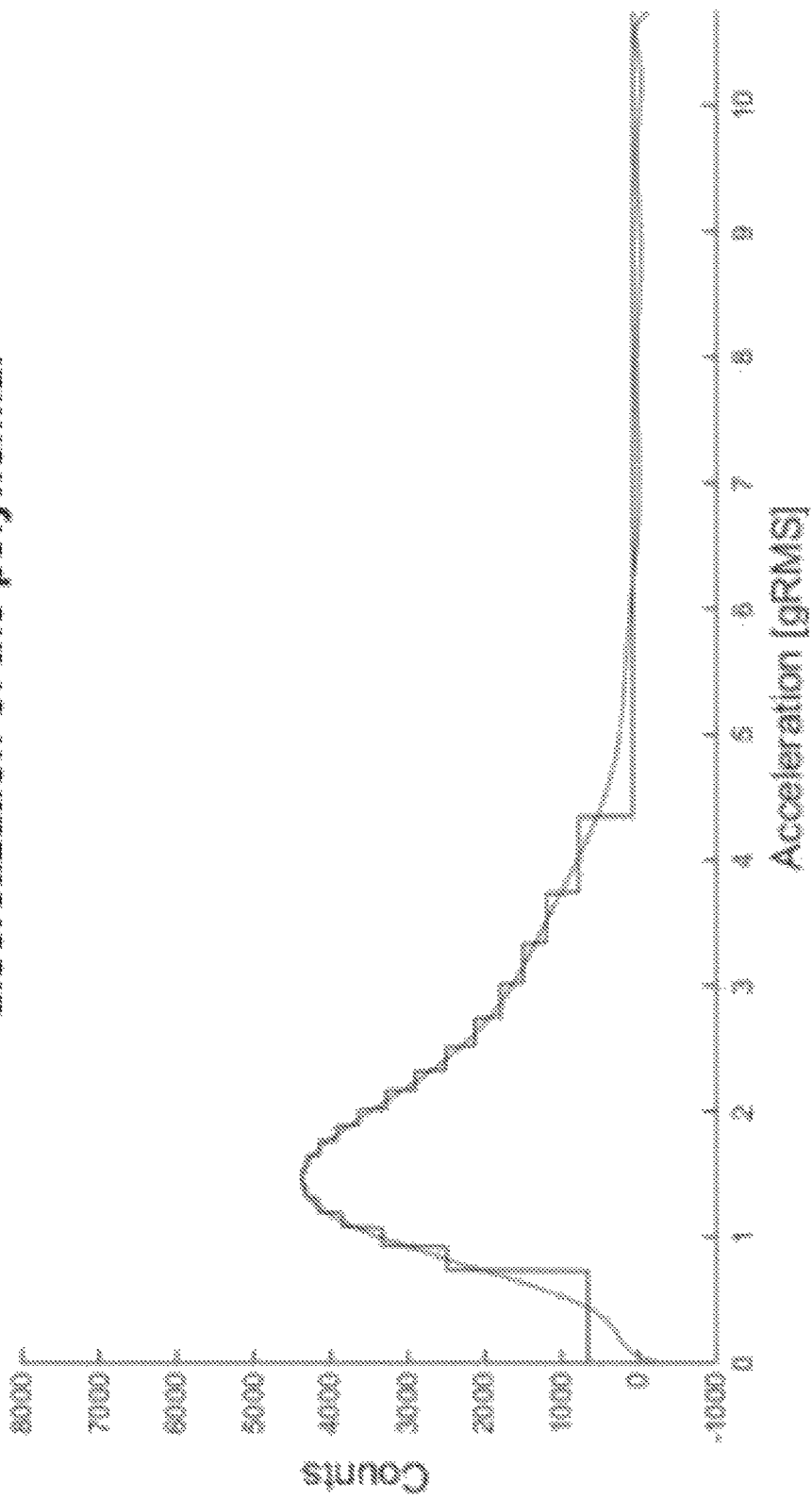
FIG. 4 illustrates a graph of a discretized technique of the typical distribution of load data, e.g. accelerations, illustrated in FIG. 3 according to aspects of the present disclosure.

At block 1108, the method 1100 includes generating load profiles from the historical load data. For example, as illustrated in FIG. 3 and FIG. 4 and as described above, histograms representing load profiles are generated.

At block 1110, the method 1100 includes determining lifetime models. The lifetime models are dependent on different loads or load combinations. If lifetime models do not exist, a best guess can be implemented. Lifetime models may be determined using laboratory tests, field tests, and/or using modeling approaches or using a synthetic lifetime model, such as a best guess lifetime model.

At block 1112, the method 1100 includes performing a bucket discretization of the load data spectrum using the techniques described herein. This enables optimal bucket sizes to be determined for the various buckets so that lifetime data can be stored to memory while using a minimum amount of memory.

At block 1114, the method 1100 includes collecting and recording measured loads of a piece of equipment (i.e., electronics, tool, etc.) in the buckets determined at block 1112. The measured loads may include temperature, accelerations, etc.

At block 1116, the method 1100 includes performing a lifetime estimation from the load data assigned to the buckets and stored to the memory. As described above, FIGS. 5, 6, and 7 illustrate lifetime estimation.

At block 1118, the method 1100 includes comparing the lifetime estimation to an actual lifetime. As described above, FIG. 8 illustrates one such example comparison. Real lifetime data (the actual lifetime) may be retrieved from the historical load data. FIG. 8 and FIG. 9 compare the bucket approach described herein with the exact modeling approach (continuous). The actual life time can still be different, but it is the same if it is assumed that the continuous life time estimation is equal to the actual consumed life time.

The method 1100 continues to block 1120 and ends.

In some examples, additional processes also may be included, and it should be understood that the processes depicted in FIG. 11 represent illustrations, and that other processes may be added or existing processes may be removed, modified, or rearranged without departing from the scope and spirit of the present disclosure.

Figure 12:
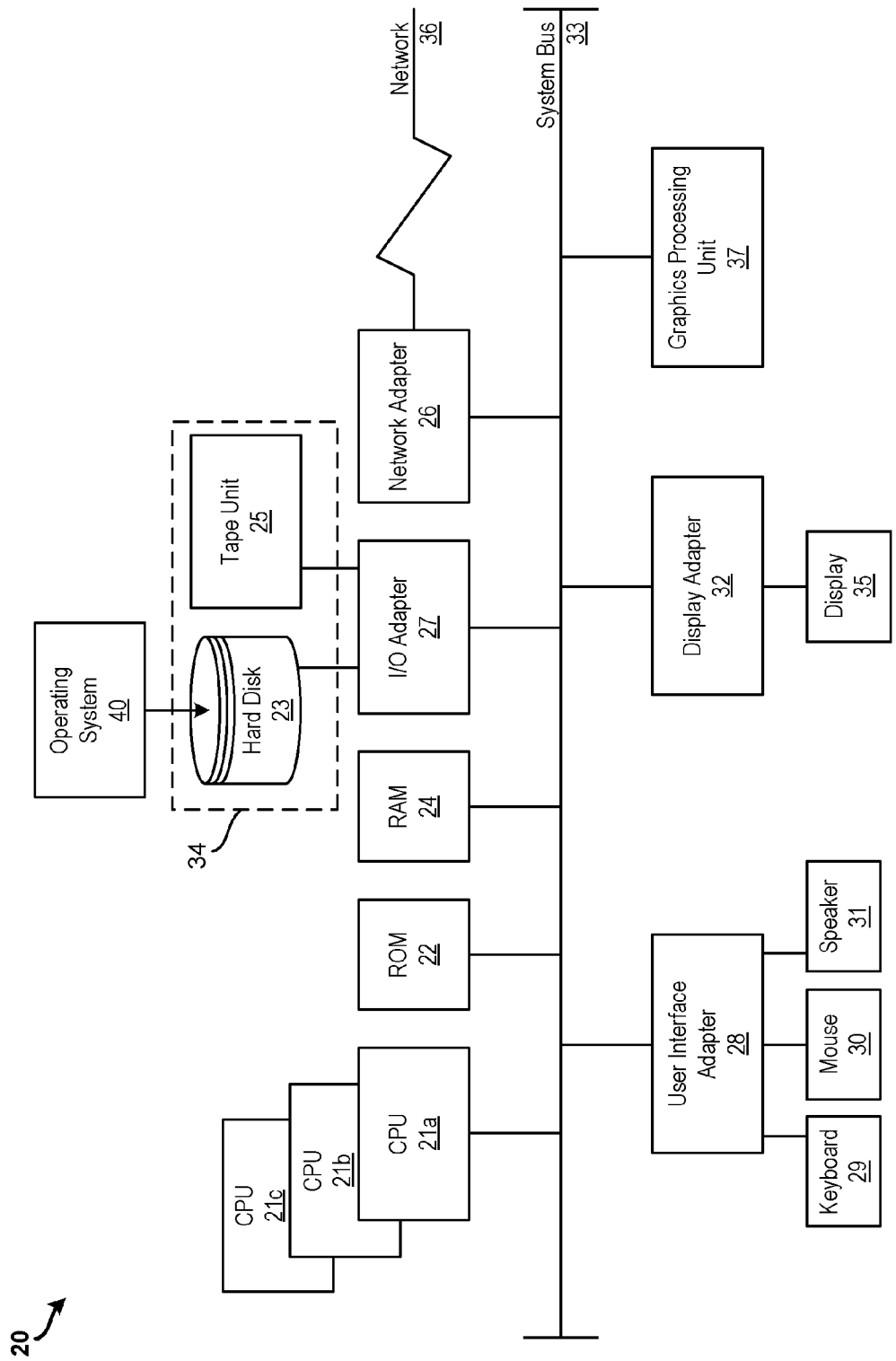
FIG. 12 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 12 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26, also referred to as network adapter, coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Set forth below are some embodiments of the foregoing disclosure:

Embodiment 1: A method for optimal storage of load data for lifetime prediction for a piece of equipment used in a well operation, the method comprising: using a lifetime model for the piece of equipment used in the well operation; discretizing, by a processing device, a load data spectrum into one or more buckets, the one or more buckets having a bucket size, wherein the bucket size of at least one bucket is based on one of the lifetime model and a distribution of load data; collecting load data of the piece of equipment; assigning, by the processing device, the collected load data to the one or more buckets of the load data spectrum; and storing, by the processing device, the collected load data assigned to the one or more buckets to a memory.

Embodiment 2: The method of any previous embodiment, wherein assigning comprises determining a distribution of load data in the one or more buckets.

Embodiment 3: The method of any previous embodiment, wherein using the lifetime model comprises using at least one of laboratory tests, field tests, or modeling approaches.

Embodiment 4: The method of any previous embodiment further comprising updating one of the lifetime model, updating the distribution of load data, and updating the bucket size for the load data spectrum for the piece of equipment.

Embodiment 5: The method of any previous embodiment further comprising compartmentalizing the memory in compartments, wherein the size of the compartments is based on one of the lifetime model and the distribution of load data.

Embodiment 6: The method of any previous embodiment further comprising determining, by the processing device, a lifetime estimation of the piece of equipment based on the load data assigned to the one or more buckets in the load data spectrum and stored to the memory.

Embodiment 7: The method of any previous embodiment further comprising replacing a piece of equipment based on the lifetime estimation.

Embodiment 8: The method of any previous embodiment wherein the distribution of load data comprises at least one of a temperature, an acceleration, a pressure, a mechanical load, and an electrical load.

Embodiment 9: The method of any previous embodiment wherein the bucket size of one or more of the buckets varies corresponding to a probability density function.

Embodiment 10: The method of any previous embodiment further comprising filtering the distribution load data by at least one of a geographic region, a piece of equipment type, a bottom hole assembly type, a drilling bit type, and a formation type.

Embodiment 11: The method of any previous embodiment wherein storing comprises using a memory located in a bottom hole assembly used in a drilling operation.

Embodiment 12: The method of any previous embodiment wherein updating comprises minimizing the failure of the lifetime estimation of a piece of equipment.

Embodiment 13: The method of any previous embodiment wherein the determining is performed inside a bottom hole assembly.

Embodiment 14: The method of any previous embodiment wherein the determining is performed outside a bottom hole assembly.

Embodiment 15: The method of any previous embodiment wherein discretizing comprises estimating a necessary size of the memory based on a given failure of the lifetime estimation.

Embodiment 16: The method of any previous embodiment further comprising communicating the determined lifetime estimation to a processing device located at a surface of the earth.

Embodiment 17: A system for optimal storage of load data for lifetime prediction for a piece of equipment used in a well operation, the system comprising: a sensor collecting load data of the piece of equipment; and a processing device for executing computer readable instructions, the computer readable instructions comprising: determining a lifetime model for the piece of equipment used in the well operation; discretizing a load data spectrum into one or more buckets, the one or more buckets having a bucket size, wherein the bucket size of at least one bucket is based on either the lifetime model or a distribution of load data; assigning the collected load data to the one or more buckets of the load data spectrum; and storing the collected load data assigned to the one or more buckets to a memory.

Embodiment 18: The system of any previous embodiment wherein the memory is in the piece of equipment and the load data are collected at the piece of equipment inside a bottom hole assembly.

Embodiment 19: The system of any previous embodiment wherein the processing device determines a lifetime estimation of the piece of equipment based on the load data assigned to the one or more buckets and stored to the memory, a communication link communicating the estimated lifetime to the surface during the well operation.

Embodiment 20: The system of any previous embodiment wherein the piece of equipment is a multi-chip module (MCM).

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

Additionally, the term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A method for optimal storage of load data for lifetime prediction for a piece of equipment used in a well operation, the method comprising:
    using a lifetime model for the piece of equipment used in the well operation;
    calculating, by a processing device, a bucket size using one of the lifetime model and a distribution of load data;
    discretizing, by the processing device, a load data spectrum into one or more buckets using the calculated bucket size;
    collecting load data of the piece of equipment;
    assigning, by the processing device, the collected load data to the one or more buckets of the load data spectrum;
    storing, by the processing device, the collected load data assigned to the one or more buckets to a memory;
    determining, by the processing device, a lifetime estimation of the piece of equipment based on the load data assigned to the one or more buckets of the load data spectrum and stored to the memory; and
    replacing or rerunning the piece of equipment based on the lifetime estimation.

2. The method of claim 1, wherein assigning comprises determining a distribution of load data in the one or more buckets.

3. The method of claim 1, wherein using the lifetime model comprises using at least one of laboratory tests, field tests, or modeling approaches.

4. The method of claim 1, further comprising updating one of the lifetime model, updating the distribution of load data, and updating the bucket size for the load data spectrum for the piece of equipment.

5. The method of claim 4, wherein updating comprises minimizing the failure of the lifetime estimation of a piece of equipment.

6. The method of claim 1, further comprising compartmentalizing the memory in compartments, wherein the size of the compartments is based on one of the lifetime model and the distribution of load data.

7. The method of claim 1, wherein the distribution of load data comprises at least one of a temperature, an acceleration, a pressure, a mechanical load, and an electrical load.

8. The method of claim 1, further comprising filtering the distribution of load data by at least one of a geographic region, a piece of equipment type, a bottom hole assembly type, a drilling bit type, and a formation type.

9. The method of claim 1, wherein storing comprises using a memory located in a bottom hole assembly used in a drilling operation.

10. The method of claim 1, wherein the determining is performed inside a bottom hole assembly.

11. The method of claim 1, wherein the determining is performed outside a bottom hole assembly.

12. The method of claim 1, wherein discretizing comprises estimating a necessary size of the memory based on a given failure of the lifetime estimation.

13. The method of claim 1, further comprising communicating the determined lifetime estimation to a processing device located at a surface of the earth.

14. A method for optimal storage of load data for lifetime prediction for a piece of equipment used in a well operation, the method comprising:
    using a lifetime model for the piece of equipment used in the well operation;
    discretizing, by a processing device, a load data spectrum into one or more buckets, the one or more buckets having a bucket size, wherein the bucket size of at least one bucket is based on one of the lifetime model and a distribution of load data;
    collecting load data of the piece of equipment;
    assigning, by the processing device, the collected load data to the one or more buckets of the load data spectrum; and
    storing, by the processing device, the collected load data assigned to the one or more buckets to a memory,
    wherein the bucket size of one or more of the buckets varies corresponding to a probability density function.

15. A system for optimal storage of load data for lifetime prediction for a piece of equipment used in a well operation, the system comprising:
- a sensor collecting load data of the piece of equipment; and
- a processing device for executing computer readable instructions, the computer readable instructions comprising:
  - determining a lifetime model for the piece of equipment used in the well operation;
  - calculating a bucket size using one of the lifetime model and a distribution of load data:
  - discretizing a load data spectrum into one or more buckets using the calculated bucket size;
  - assigning the collected load data to the one or more buckets of the load data spectrum;
  - storing the collected load data assigned to the one or more buckets to a memory;
  - determining a lifetime estimation of the piece of equipment based on the load data assigned to the one or more buckets of the load data spectrum and stored to the memory; and
  - replacing or rerunning the piece of equipment based on the lifetime estimation.

16. The system of claim 15, wherein the memory is in the piece of equipment and the load data are collected at the piece of equipment inside a bottom hole assembly.

17. The system of claim 15, further comprising a communication link communicating the estimated lifetime to a surface during the well operation.

18. The system of claim 15, wherein the piece of equipment is a multi-chip module (MCM).

* * * * *